United States Patent
Hofmann et al.

(10) Patent No.: US 8,467,161 B2
(45) Date of Patent: Jun. 18, 2013

(54) DEVICE FOR PROTECTING A DC VOLTAGE CONVERTER

(75) Inventors: Michael Hofmann, Neubiberg (DE);
Edmund Schirmer, Nürnberg (DE);
Peter Mühlenbrock, Nürnberg (DE);
Wilhelm Berg, Nürnberg (DE); Gerald Kollenda, Gerhardshofen (DE)

(73) Assignee: Conti Temic mircoelectronic GmbH (DE)

( * ) Notice: Subject to any disclaimer, the term of this patent is extended or adjusted under 35 U.S.C. 154(b) by 339 days.

(21) Appl. No.: 13/055,002

(22) PCT Filed: Aug. 5, 2009

(86) PCT No.: PCT/DE2009/001082
§ 371 (c)(1),
(2), (4) Date: Jan. 20, 2011

(87) PCT Pub. No.: WO2010/017803
PCT Pub. Date: Feb. 18, 2010

(65) Prior Publication Data
US 2011/0121807 A1    May 26, 2011

(30) Foreign Application Priority Data
Aug. 13, 2008  (DE) .................. 10 2008 038 847

(51) Int. Cl.
*H02H 3/00*  (2006.01)

(52) U.S. Cl.
USPC ............................................. 361/42

(58) Field of Classification Search
USPC ............................................. 361/42
See application file for complete search history.

(56) References Cited

U.S. PATENT DOCUMENTS

| | | | | |
|---|---|---|---|---|
| 4,783,755 A | * | 11/1988 | Blanchard et al. | 702/176 |
| 5,835,426 A | * | 11/1998 | Koura | 365/200 |
| 7,486,491 B2 | * | 2/2009 | Suzuki et al. | 361/42 |
| 7,583,483 B2 | * | 9/2009 | Trenchs et al. | 361/42 |
| 7,800,880 B2 | * | 9/2010 | Hu et al. | 361/111 |
| 2005/0254273 A1 | * | 11/2005 | Soudier et al. | 363/103 |
| 2007/0188948 A1 | * | 8/2007 | Morita | 361/42 |
| 2007/0268636 A1 | * | 11/2007 | Suzuki et al. | 361/48 |
| 2008/0150505 A1 | | 6/2008 | Abe | |
| 2009/0096293 A1 | * | 4/2009 | Nakayama et al. | 307/140 |

* cited by examiner

*Primary Examiner* — Ronald W Leja
(74) *Attorney, Agent, or Firm* — RatnerPrestia

(57) ABSTRACT

A device for controlling and regulating a DC voltage converter. The device may have one or more power output stages and a control unit with a signal ground line. The one or more power output stages and the control line have a mutual ground potential. A switch for electrically disconnecting the signal ground line is provided. The switch is opened, when the DC voltage converter is active and the switch is closed, when the DC voltage converter is inactive.

11 Claims, 2 Drawing Sheets

DEVICE FOR PROTECTING A DC VOLTAGE CONVERTER

CROSS REFERENCE TO RELATED APPLICATIONS

This application is the U.S. National Phase Application of PCT International Phase Application No. PCT/DE2009/001082, filed Aug. 5, 2009, which claims priority to German Patent Application No. 10 2008 038 847.5, filed Aug. 13, 2008, the contents of such applications being incorporated herein by reference.

FIELD OF THE INVENTION

The invention relates to a device for protecting a DC voltage converter.

BACKGROUND OF THE INVENTION

Various topologies of DC voltage converters are known from the art. The DC voltage converter can comprise one or more power output stages and a unit for controlling and/or regulating the DC voltage converter, the power output stages and the unit comprising a mutual ground, for example a vehicle body.

Here, it is, however, disadvantageous that with certain operating states an operating current of the power output stages can flow via electrical cable connections of the unit or via cable shields. Since these cable connections generally are not provided for such large electric currents, the high load can lead to damages or destruction of the cable connections or of the electrical components arranged in these areas. The operating states are characterized for example by a high-impedance ground line connection of the power output stages, which are caused e.g. by corrosion and/or loss of a ground strap.

SUMMARY OF THE INVENTION

It is, therefore, an object of the invention to indicate a suitable device for protecting a DC voltage converter, with the aid of which the disadvantages indicated in the art are overcome.

The device according to aspects of the invention for protecting a DC voltage converter comprises one or more power output stages and a control unit with a signal ground line, which comprise a mutual ground potential. According to aspects of the invention a switch for the electrically disconnecting the signal ground line is provided, wherein the switch is opened when the DC voltage converter is active and the switch is closed when the DC voltage converter is inactive.

This switch makes it possible to protect electrical lines of the device and electrical and/or electronic components arranged therein against a too high current load and to thus increase its life time.

Alternatively or additionally, the device comprises a measurement amplifier, which is provided to determine a voltage difference between the mutual ground potential of the DC voltage converter and the vehicle ground. For the voltage difference determined thereby a limit value can be predetermined, wherein in accordance with a further development of the invention the DC voltage converter can be deactivated when reaching or exceeding the limit value or can be put into a defined state. This ensures a broad improved protection of the device, its electrical conductor and components against a too high current load.

BRIEF DESCRIPTION OF THE DRAWINGS

The invention is best understood from the following detailed description when read in connection with the accompanying drawings. Included in the drawings is the following figures:

Examples of embodiment of aspects of the invention will become apparent in the following on the basis of the drawings, in which FIG. 1 schematically shows a device for controlling/regulating a DC voltage converter according to the art, FIG. 2 schematically shows a device in accordance with FIG. 1 with a switch arranged in a signal ground line, FIG. 3A schematically shows a first example of embodiment of the switch in accordance with FIG. 2, FIG. 3B schematically shows a second example of embodiment of the switch in accordance with FIG. 2, FIG. 4 schematically shows the device in accordance with FIG. 2 and a first example of embodiment of a detecting unit for determining a voltage difference, and FIG. 5 schematically shows the device in accordance with FIG. 2 and a second example of embodiment of a detecting unit for determining a voltage difference.

DETAILED DESCRIPTION OF THE PREFERRED EMBODIMENTS

Figure 1:
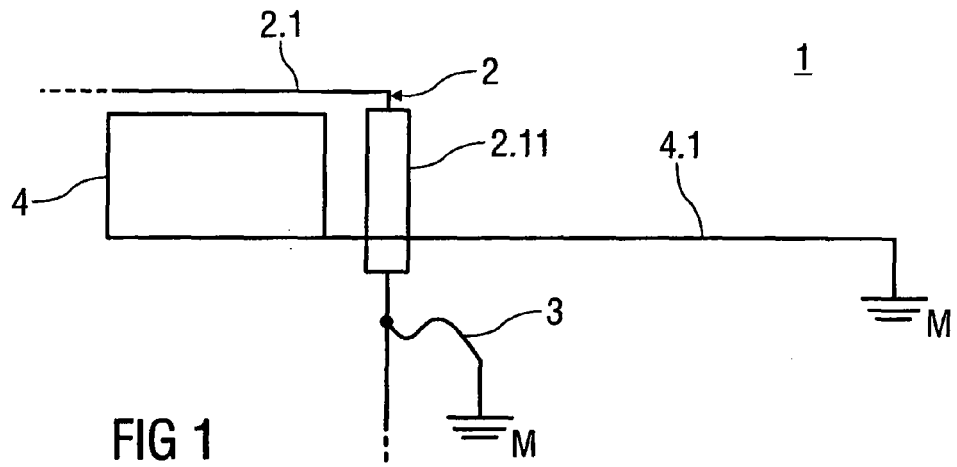

In FIG. 1 a connection concept 1 for signal and power ground of a DC voltage converter 2 is shown according to the art. Here, the DC voltage converter 2 is embodied as a bi-directional DC voltage converter 2, possibly also as a uni-directional converter, which in accordance with a further development of aspects of the invention not shown in detail comprises a low voltage output stage and a high voltage output stage and, if necessary, further components such as a transformer, throttles, capacitors, etc.

The DC voltage converter 2 is provided in a vehicle not shown in detail, for example a vehicle with an electric drive, with a hybrid drive or a fuel cell vehicle for the transformation of different DC voltages. Further, also an application of the DC voltage converter 2 is possible in all other conceivable mobile and immobile electrical systems. This may be for example systems and vehicles in railway engineering, shipping or aerospace engineering.

The electrical lines of the high voltage output stage, for example cable connections, are preferably provided with a shield, e.g. are embodied for example as a shielded cable in order to protect electrical consumers against electromagnetic couplings into the high voltage output stage.

The DC voltage converter 2 further comprises a unit 4, which is provided for controlling/regulating the DC voltage converter 2, its power output stages. Apart from signal and/or communication lines not shown in detail this control unit 4 comprises a signal ground line 4.1, which is led by means of a signal tap lead-through 2.11 through a housing 2.1 of the DC voltage converter 2.

Both the low voltage output stage and the control unit comprise a mutual electrical ground connection, which is referred to in the following as power ground 3. This power ground 3 is embodied for example as a flat cable, a round cable or a ground strap or the ground potential is directly applied to the housing 2.1 of the DC voltage inverter 2.

The signal ground line 4.1 and the power ground 3 are electrically connected with a mutual ground potential M. This ground potential M can be for example a metallic vehicle body, which can be used as a return conductor for an electric operating current of the power output stages and for a signal current of the control unit. Also the shield of connecting cables and lines is electrically connected with the ground potential M.

However, it is disadvantageous that with a high-impedance connection of the power ground 3 with the ground potential M, for example with a corrosion or a detached fastener, the operating current of the power ground 3 is returned via the signal ground line 4.1 or the shield of the high voltage output stage. Here, apart from an impairment of an operation of the control unit 4 and thus of the DC voltage converter 2, at worst this can result in a damage or destruction of the signal ground line 4.1 or of the shield, since their conductor cross section is not designed for an electrical load with the operating current of the power output stages.

Figure 2:
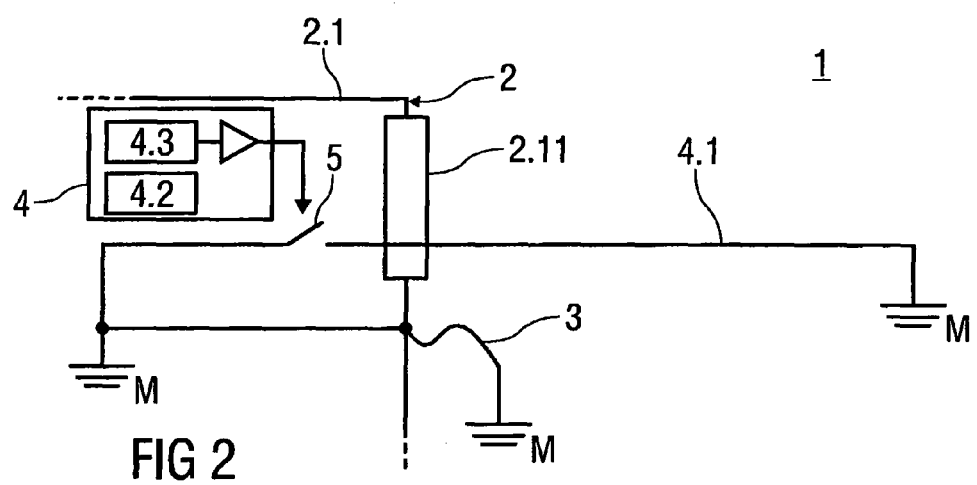

In FIG. 2 the device 1 is shown in accordance with FIG. 1, wherein a switch 5 is provided according to aspects of the invention for electrically disconnecting the signal ground line 4.1.

The switch 5 is closed when the power output stages of the DC voltage converter 2 are not actuated, i.e. when no energy is transferred. This is true for example in a rest state (=standby) or with a software download. In the following, this state is referred to as an inactive state of the DC voltage converter 2.

Here, the control unit 4 is electrically connected via the signal ground line 4.1 with the ground potential M, irrespective of whether the DC voltage converter 2 is connected with the ground potential M. The control unit 4 comprises at least one component 4.2 for controlling/regulating the DC voltage converter 2 and at least one further component 4.3, for example a microcontroller, a switchgear or another suitable device, for controlling the switch 5.

Before actuating the power output stages, i.e. before activating the DC voltage converter 2, the switch is 5 opened so that the signal ground line 4.1 is electrically disconnected from the mutual ground potential M of the DC voltage converter. This provides for the advantage that with a high-impedance power ground 3 the operating current of the power output stages cannot be conducted via the signal ground line 4.1 and thus the latter and electrical components arranged at the signal ground line 4.1, such as for example the control unit 4, are protected against being actuated by the operating current.

Figure 3A:
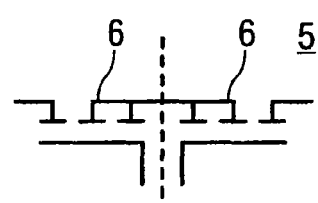
Figure 3B:
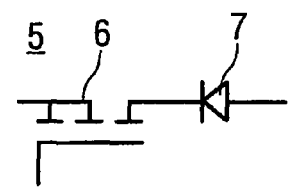

FIGS. 3A and 3B show two possible forms of embodiment of the switch 5, wherein the latter in a first form of embodiment is formed of two electrically anti-serially interconnected transistors 6, for example MOS transistors, or in a second example of embodiment is formed of a series connection of a single transistor 6 and a diode 7 with suitable polarity. In further examples of embodiment of aspects of the invention not represented in detail the switch 5 is realizable also by electrical or electronic elements, for example a relay.

Figure 4:
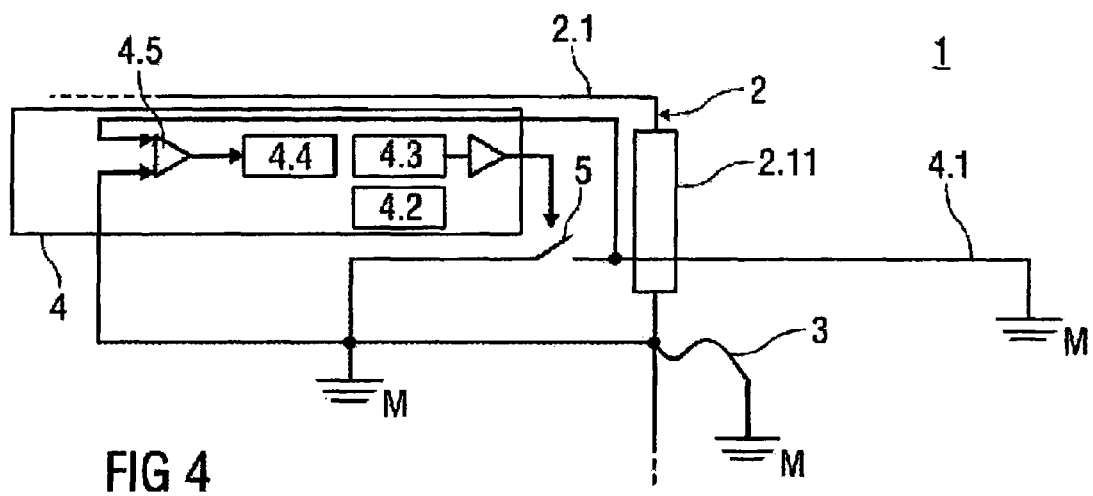

In FIG. 4 the device is shown in accordance with FIG. 2, wherein the control unit 4 comprises a detecting unit 4.4 and a measurement amplifier 4.5 for determining the voltage difference between the mutual ground potential M of the DC voltage converter 2 and the ground 4.1.

Thus, it is possible in an advantageous manner to avoid in addition a return of the operating current via the shield of the electrical lines of the high voltage connection or via current paths not intended for this purpose according to the basic thought of structure and thus to prevent a damage or destruction of the current paths.

In the opened state of the switch 5, i.e. the DC voltage converter 2 is activated, a potential difference between the ground 4.1 and the mutual ground potential M of the DC voltage converter 2 can be determined by means of the measurement amplifier 4.5 and can be supplied to the detecting unit 4.4. Since the signal ground line 4.1 is virtually currentless due to the opened switch 5, only a negligible small voltage drop appears between the signal ground line 4.1 and the ground potential M of the vehicle.

When using the vehicle body as a mutual ground potential M a voltage drop on the body is negligibly small due to a cross section which is large in relation to all other electrical lines and due to a plane structure.

With a low-impedance electrical connection via the power ground 3 the determined potential difference between the vehicle ground and the ground of the DC voltage converter is very small.

The higher the impedance of this electrical connection is, for example caused by corrosion, loss of a ground strap or a detached fastener, the higher the detected voltage value. In a limit case, if there is no longer an electrical connection between the ground of the DC voltage converter via the power ground 3 to the ground potential M of the vehicle, the return of the operating current of the power output stages can be effected only via the shield of the electrical lines of the high voltage connection or via current paths not intended according to the basic thought of structure, since the switch 5 is opened in the signal ground line 4.1. Here, a very significant voltage difference is measurable via the measurement amplifier 4.5.

By determining a limit value, which can be adjusted for example depending on a wiring topology in the vehicle, a unique criterion for the detection of an error in the electrical connection of the power ground 3 can be indicated.

When exceeding this limit value, in advantageous manner due to a signal generated by the detecting unit 4.4, the DC voltage converter 2 can be deactivated or can be put into a defined state, so that the operating current return can be kept via the shield within admissible limits or can be deactivated in total.

Figure 5:
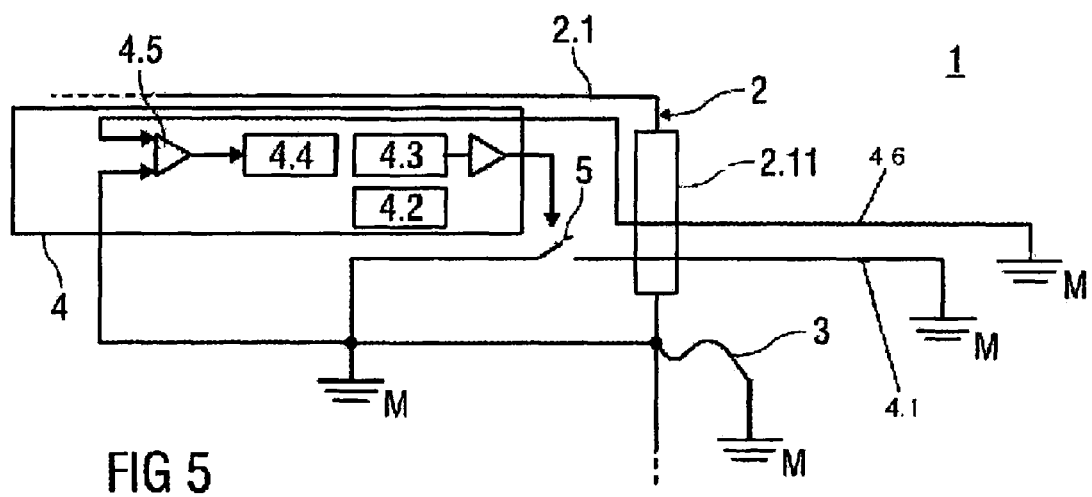

FIG. 5 shows the device 1 in accordance with FIG. 4, wherein a separate measuring line 4.6 is provided here for measuring the electrical ground potential M. The measuring line 4.6 can be a line provided for this purpose or also an already existing ground line (e.g. Cl. 31).

By means of the device 1 according to aspects of the invention it is in summary possible to effectively protect both the signal ground line 4.1 and the shield of the electrical conductors and other ground connections with a small conductor cross section against too high currents and to monitor a quality of the electrical connection of the ground of the DC voltage converter via the power ground 3 with the ground potential M of the vehicle.

The invention claimed is:

1. A device for controlling/regulating a DC voltage converter, comprising one or more power output stages and a control unit with a signal ground line, the one or more power output stages and the control unit having a mutual ground potential, and
a switch for electrically disconnecting the signal ground line, wherein
the switch is opened when the DC voltage converter is active and the switch is closed when the DC voltage converter is inactive.

2. The device according to claim 1, wherein the control unit comprises components for controlling/regulating the DC voltage converter and the switch.

3. The device according to claim 1, wherein the control unit is electrically connected via the signal ground line with the mutual ground potential.

4. The device according to claim 1, wherein the control unit comprises a detecting unit and a measurement amplifier for determining a voltage difference between the mutual ground potential of the DC voltage converter and a vehicle ground which drops at the power ground.

5. The device according to claim 4, wherein for the determined voltage difference a limit value can be predetermined, which optionally can be tracked dynamically or which can also remain constant.

6. The device according to claim 5, wherein when reaching or exceeding the limit value the DC voltage converter can be disconnected or put into a defined state.

7. The device according to claim 1, wherein the DC voltage converter is a bi-directional DC voltage converter.

8. The device according to claim 1, wherein the DC voltage converter is a an uni-directional DC voltage converter.

9. The device according to claim 1, wherein the DC voltage converter comprises a low voltage power output stage and a high voltage power output stage.

10. The device according to claim 1, wherein the DC voltage converter is arranged in a vehicle.

11. The device according to claim 10, wherein the DC voltage converter is arranged in a vehicle with an electric drive, a vehicle with a hybrid drive or in a fuel cell vehicle.

\* \* \* \* \*